(No Model.) 6 Sheets—Sheet 1.
H. H. HOOBLER & M. P. HEADLEE.
CORN PLANTER.

No. 553,913. Patented Feb. 4, 1896.

Witnesses
Jas. K. McCathran

Inventors
H. H. Hoobler
M. P. Headlee (No Model.) 6 Sheets—Sheet 3.
H. H. HOOBLER & M. P. HEADLEE.
CORN PLANTER.

No. 553,913. Patented Feb. 4, 1896.

Witnesses
Jas. K. McCathran

Inventors
H. H. Hoobler
M. P. Headlee
By their Attorneys,
C. A. Snow & Co.

(No Model.) 6 Sheets—Sheet 4.
H. H. HOOBLER & M. P. HEADLEE.
CORN PLANTER.

No. 553,913. Patented Feb. 4, 1896.

Witnesses
Jas. K. McCathran

Inventors
H. H. Hoobler
M. P. Headlee
By their Attorneys,
C. A. Snow & Co.

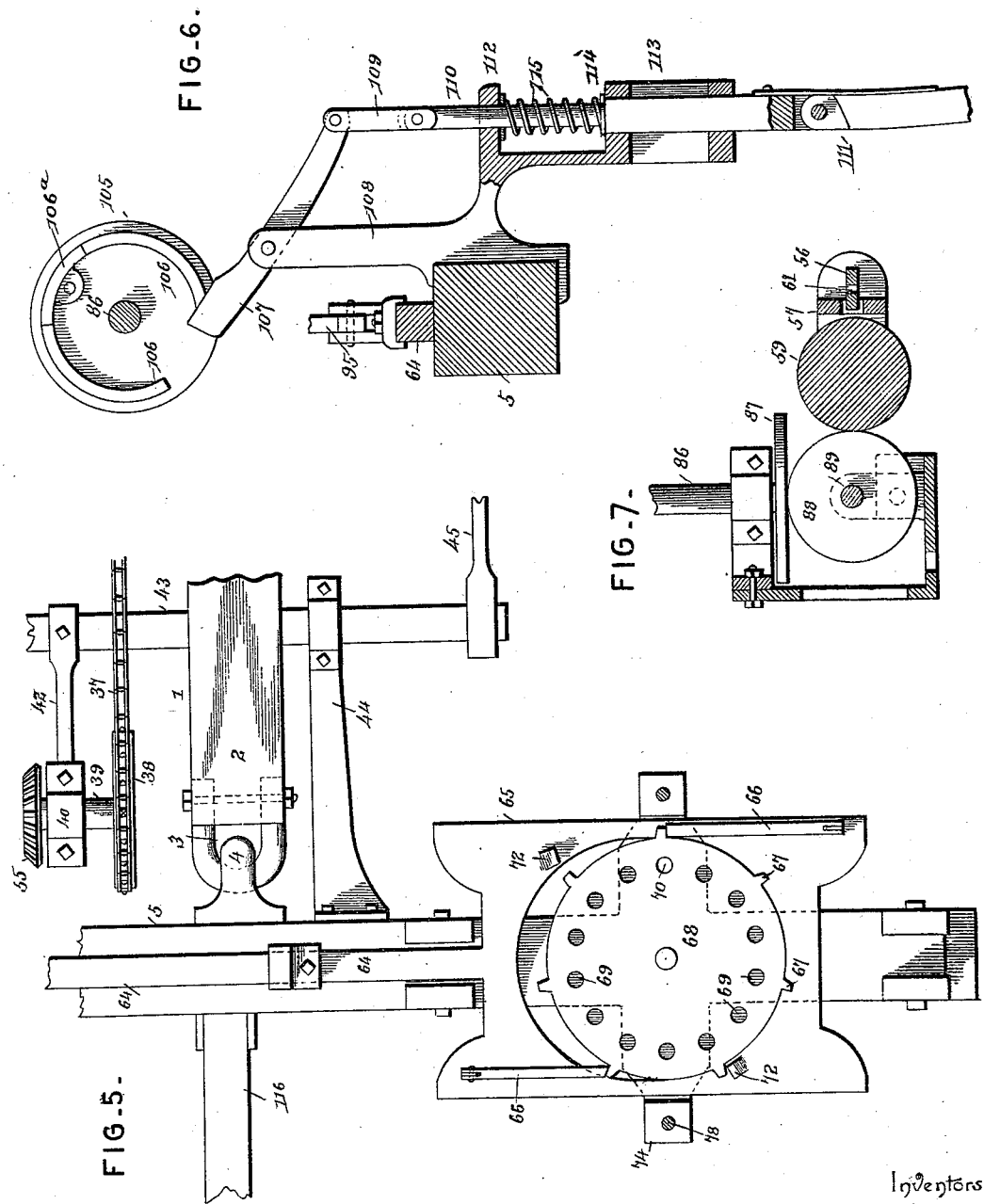

(No Model.) 6 Sheets—Sheet 6.
H. H. HOOBLER & M. P. HEADLEE.
CORN PLANTER.
No. 553,913. Patented Feb. 4, 1896.
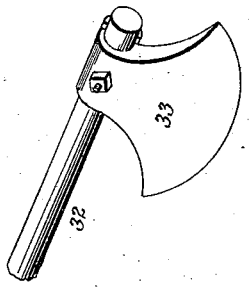
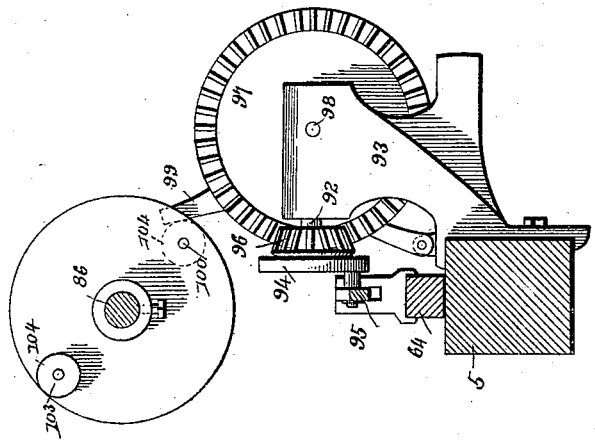
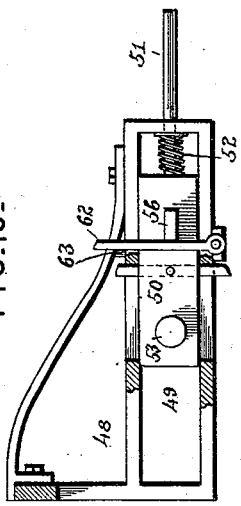
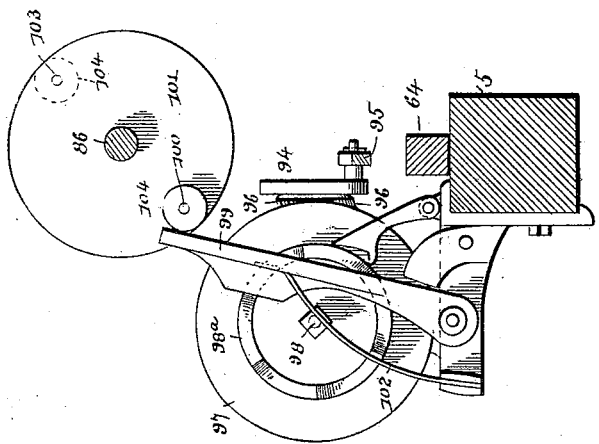
Witnesses
Jas. K. M<sup>c</sup>Cathran
By Their Attorneys.
Inventors
H. H. Hoobler
M. P. Headlee

UNITED STATES PATENT OFFICE.

HENRY H. HOOBLER AND MELVIN P. HEADLEE, OF PLEASANT HOPE, MISSOURI.

CORN-PLANTER.

SPECIFICATION forming part of Letters Patent No. 553,913, dated February 4, 1896.

Application filed October 16, 1894. Serial No. 526,093. (No model.)

*To all whom it may concern:*

Be it known that we, HENRY H. HOOBLER and MELVIN P. HEADLEE, citizens of the United States, residing at Pleasant Hope, in the county of Polk and State of Missouri, have invented a new and useful Corn-Planter, of which the following is a specification.

Our invention relates to corn-planters of the type known as "check-row" corn-planters; and the objects in view are to provide means for equalizing or causing a uniformity in the distances between the contiguous hills in traversing uneven or irregular ground. It is obvious that a rise or depression in the surface traversed by a planter increases the actual distance, and hence causes an irregularity of the hills and rows; and it is our object to provide an automatic governing or controlling mechanism to regulate the movement of the feeding or planting devices, whereby the hills will be planted at regular or uniform intervals measured upon a horizontal plane or a plane coincident with the general surface of the field.

Further objects and advantages of the invention will appear in the following description, and the novel features thereof will be particularly pointed out in the appended claims.

Figure 1:
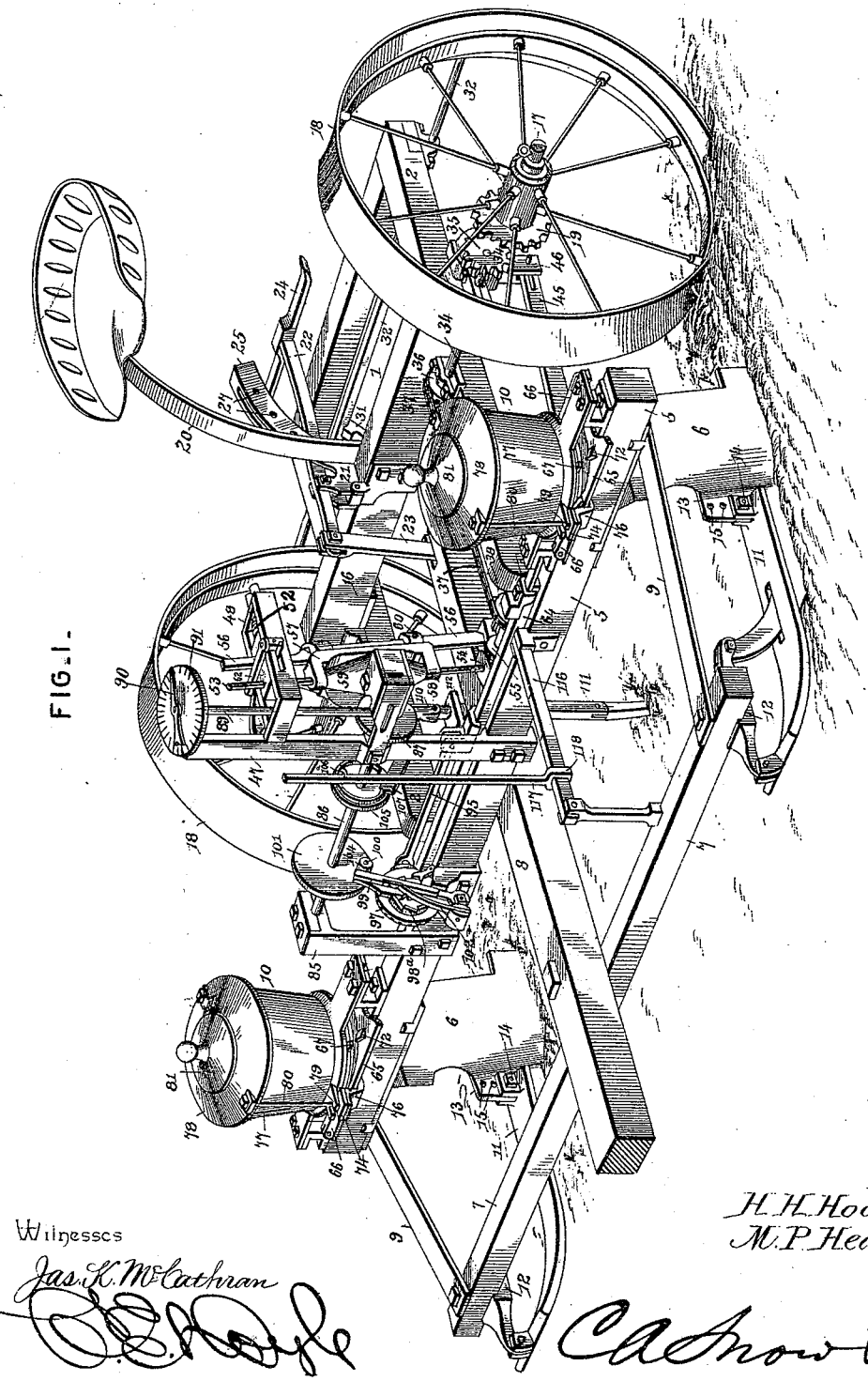
Figure 2:
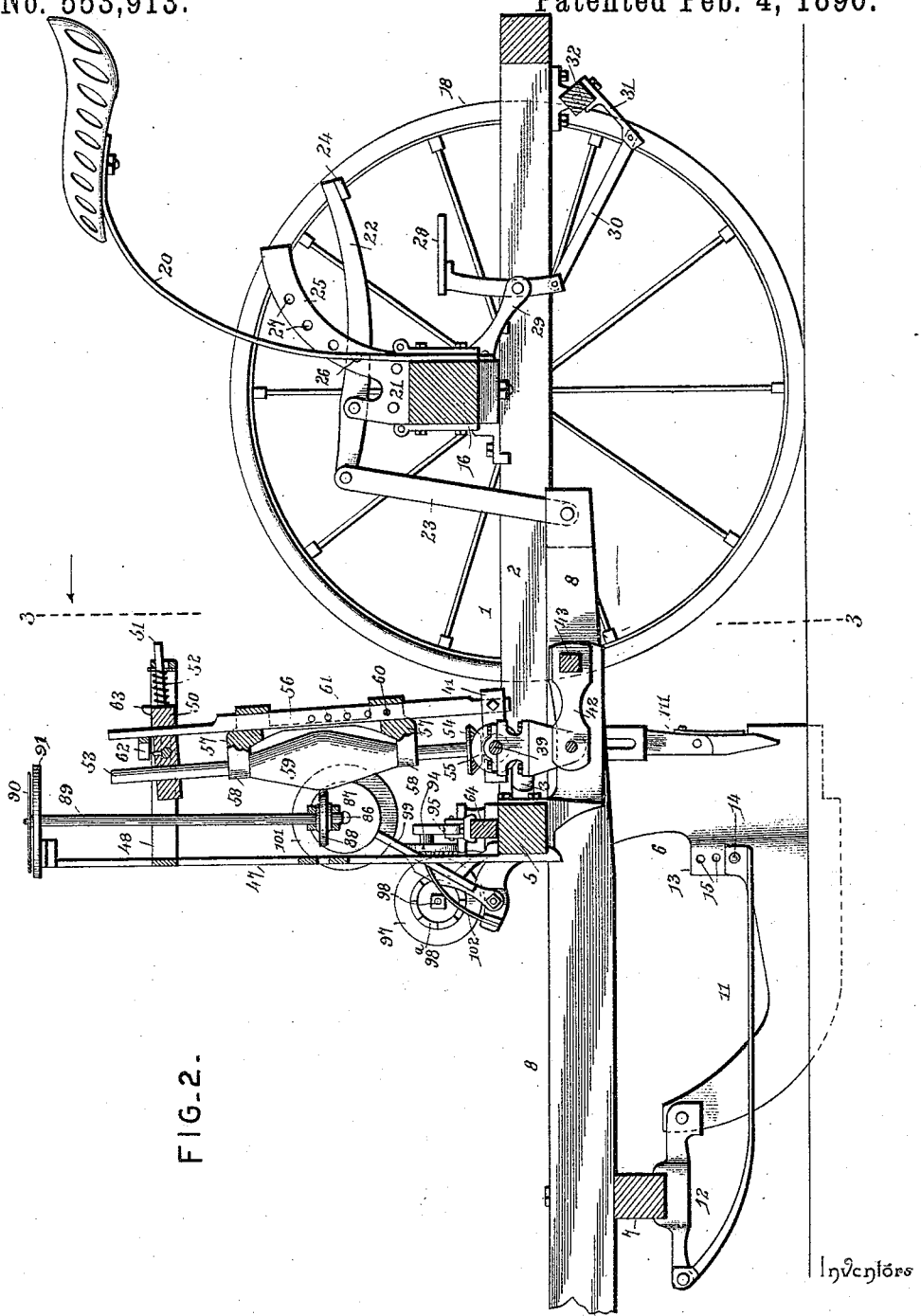
Figure 3:
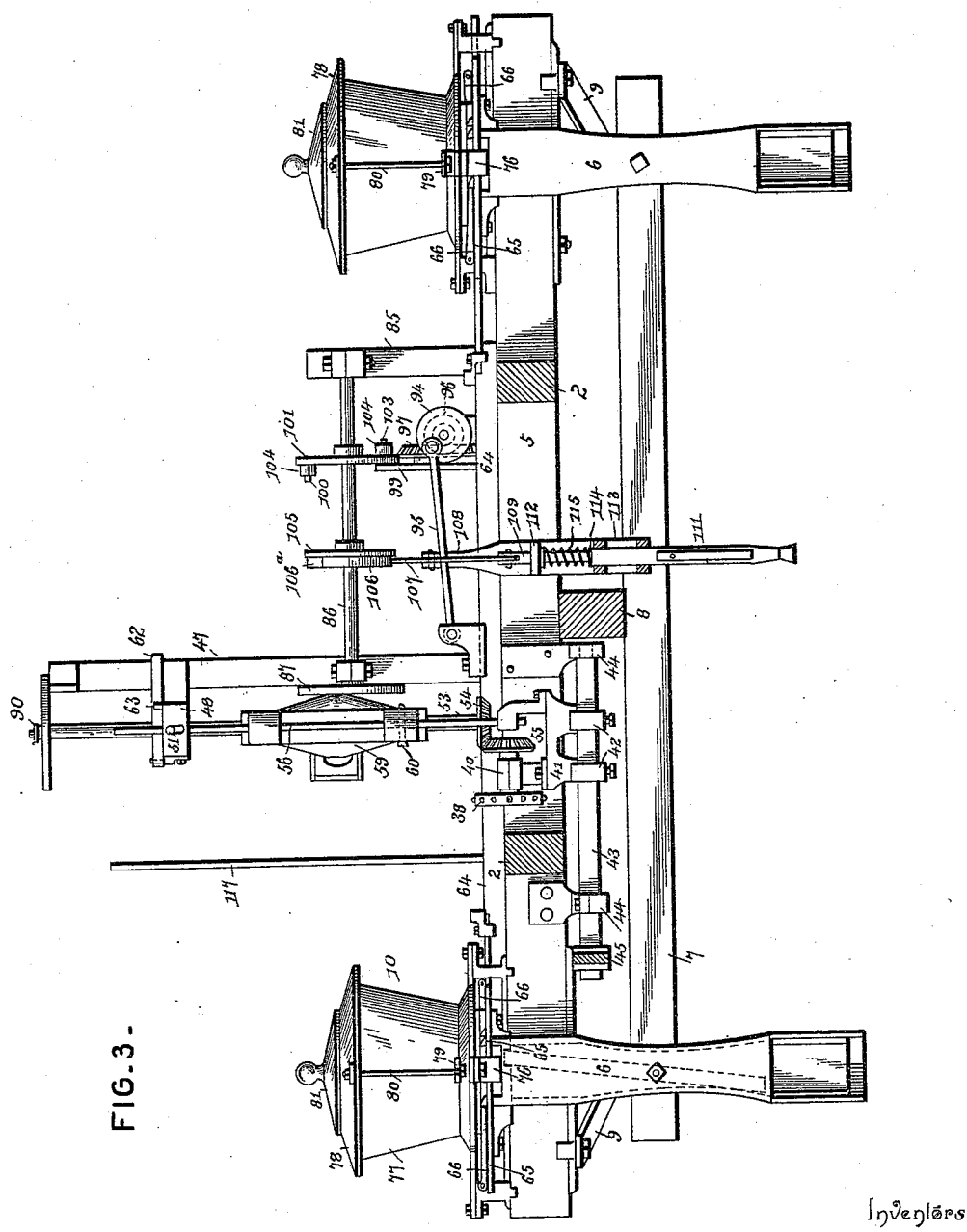
Figure 4:
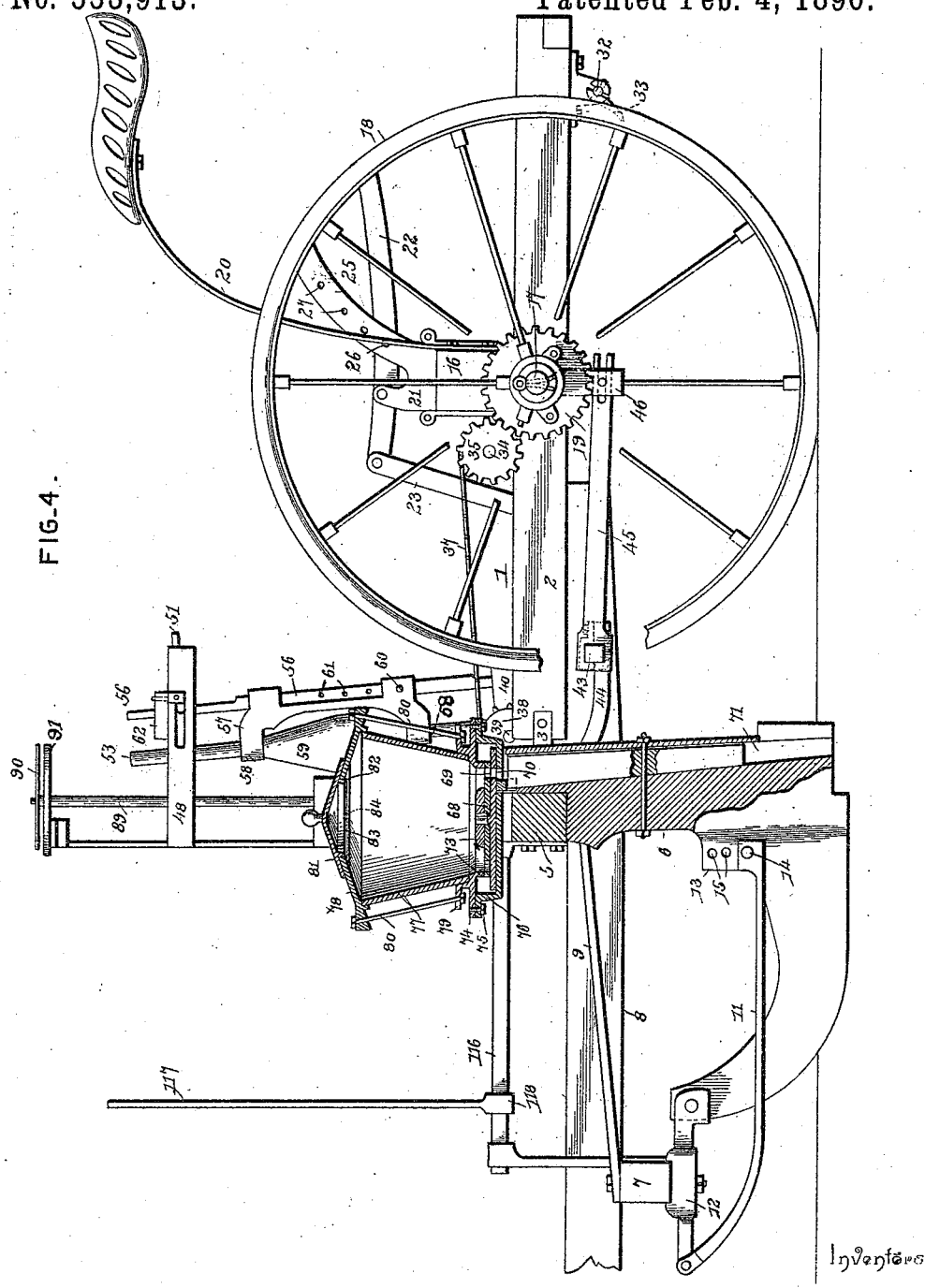

In the drawings, Figure 1 is a perspective view of a corn-planter embodying our invention. Fig. 2 is a longitudinal section of the same. Fig. 3 is a vertical transverse section on the line 3 3 of Fig. 2. Fig. 4 is a side view partly broken away. Fig. 5 is a detail plan view of the connection between the frames and the means for operating a seed-disk. Fig. 6 is a detail view of the marker and means for operating the same. Fig. 7 is a detail horizontal section through the cone-pulley, showing the adjacent friction-disks. Fig. 8 is a detail view of the means for operating the dropping-bar. Fig. 9 is a view of the opposite side of the same. Fig. 10 is a detail plan view of the means for holding the cone-pulley in frictional contact with the friction-disk. Fig. 11 is a detail view of one of the scraping-shoes.

Similar numerals of reference indicate corresponding parts in all the figures of the drawings.

1 designates a main frame, which in the construction illustrated in the drawings is of substantially U shape, with its parallel side arms 2 terminating in eyes 3, which are engaged with corresponding eyes 4 on a cross-beam 5, which connects the furrow-opening shoes 6 at their rear ends. The front ends of these furrow-opening shoes are connected by a front cross-beam 7, to the center of which is attached the tongue 8, said tongue being also attached to the cross-beam 5 and extending in rear thereof. The cross-beam 5 projects laterally beyond the plane of the furrow-opening shoes 6, and its extremities are connected to the front cross-beam 7 by means of the side braces 9, said extensions of the cross-beam 5 being designed to support the seed-boxes 10.

In connection with the furrow-opening shoes we employ auxiliary or floating shoes 11, which are pivotally connected at their front ends to forwardly-extending brackets 12, attached to the front cross-beam 7 and connected at their rear ends to wings 13, forming parts of the furrow-opening shoes by means of transverse bolts 14. Said transverse bolts engage perforations 15 in the wings 13, and as a plurality of these perforations is provided the rear ends of the floating shoes may be adjusted to allow greater or less depression of the furrow-opening shoes. These floating shoes serve as guides to regulate the depth to which the furrow-opening shoes sink in the soil.

The main frame is provided at an intermediate point with a transverse beam 16, to which are attached the stub-axles 17, and upon these stub-axles are mounted the ground-wheels 18, one of which performs the function of a driving-wheel, and for the purpose of communicating motion to mechanism hereinafter described is provided with a gear 19. The seat-standard 20 is fixed to the cross-beam 16 of the main frame, and adjacent thereto in a bracket 21 is pivoted a foot-lever 22, connected by means of a link 23 to the rear end of the tongue 8. By means of this foot-lever, which is provided at its rear end with a cross-bar 24 to receive the pressure of the feet or the operator, the rear end of the planter-frame with the furrow-opening shoes may be elevated. An arc-shaped guide 25 is attached to the bracket 21, and a pin 26 is adapted to be engaged with one of a series of perforations 27 to hold said foot-lever in the desired position to maintain the planter-frame in the proper position with relation to the main frame. Another foot-lever 28, which is fulcrumed to a bracket 29, attached to the rear side of the cross-beam 16, is connected by means of a link 30 to a crank-arm 31 on the rocker-shaft 32, said rocker-shaft carrying the cleaning-shoes 33, which serve to move the earth from the grooves of the ground-wheels.

34 represents a shaft mounted in suitable bearings upon the main frame and provided with a pinion 35, meshing with the gear 19, whereby motion is communicated thereto from the driving-wheel, and at its opposite or inner end said shaft 34 is provided with a chain-wheel 36, connected by means of a chain 37 with a similar wheel 38 on a counter-shaft 39. This counter-shaft is mounted in a bearing 40 on a casting 41, and said casting is pivotally connected to supporting-arms 42 on the rock-shaft 43, the rock-shaft being mounted in bearings at the rear ends of the brackets 44, which extend rearward from the cross-beam 5 of the planter-frame. The rock-shaft is connected by means of a lever 45 with an arm 46, depending from the main frame in the vertical plane of the ground-wheel axles.

The connection between the lever 45 and the arm 46 is slotted to provide for a loose relative movement of these parts, and it is obvious that when the ground-wheels rise or fall below their normal position with relation to the planter-frame, either by passing over a hillock, or a rise in the surface of the ground, or by dropping into a depression, the rear end of the lever 45 will move in a corresponding direction and thus communicate motion to the rock-shaft 43, whereby when the ground-wheels rise above their normal position the casting 41 will descend, and when the ground-wheels drop below their normal position said casting will rise.

Rising from the cross-beam 5, near its center, is a standard 47, having a rearwardly-extending bracket 48, which is provided with a longitudinally-disposed slot 49, and in this slot is mounted a follower-block 50, provided with a rearwardly-extending stem 51 and an actuating-spring 52 coiled upon said stem and bearing against the rear wall of the slot. Mounted at its lower end in a bearing in the casting 41 and at its upper end in a bearing in the follower-block 50 is a shaft 53, provided at its lower end with a bevel-gear 54, which meshes with a similar bevel-gear 55, carried by the shaft 39, and pivotally connected at its lower end to the casting 41 is a bar 56, engaged at its upper end in an opening in the block 50, said bar supporting a yoke 57, having upper and lower eyes 58, which are slidably mounted upon the shaft 53. Feathered upon the shaft 53 between the eyes 58 of the yoke is a double conical friction-roll 59, which is enlarged at its center and tapered toward its upper and lower extremities. The yoke 57 is held at the desired elevation upon the bar 56 by means of a locking-pin 60, engaging a perforation in the yoke and one of a series of perforations 61 in the bar. It will be understood that the shaft 53 and the bar 56 are slidably fitted in their bearings in the block 50, whereby free vertical movement of the casting 41 and the parts connected to and supported thereby is permitted. Pivotally connected to the bracket 48 and arranged contiguous to the upper projecting end of the bar 56 is a hand-lever 62, which is adapted to be swung rearward at its free end to repress the follower-block with the shaft 53 against the tension of the actuating-spring 52, for a purpose hereinafter explained, and a stop or catch 63 is provided for engagement with the lever 62 to hold said parts in their repressed positions.

Slidably mounted upon the upper side of the cross-beam 5 is a dropping-bar 64, provided at its extremities with the horizontally-movable yoke 65 carrying pivotal pawls 66 for engagement with projections or teeth 67 on the rotary seed-disks 68, said seed-disks being provided with gage-openings 69 adapted to register successively with a feed-opening 70, which communicates with the seed-chute 71. The yokes 65 are also provided to coact with the pawls 66, having stops 72 to limit the movements of the seed-disks and prevent the same from moving a greater distance than is necessary to plant one hill. The teeth 67 of the disks 68 are beveled upon one side to allow the pawls to slip idly thereover and are provided with abrupt rear sides for engagement with the extremities of the pawls. Arranged above the plane of each seed-disk is an annular base-ring 73 provided with lateral ears 74, which are secured by bolts 75 to standards 76 on the beam 5, said standards also serving the purpose of guides for the dropping-bar 64, and fitting within a rabbet in the upper side of the base-ring is the shell 77 of the seed-box. This shell is held in place by means of a top 78 secured to the front and rear notched ears 79 on the base-ring by means of vertical bolts 80. Each seed-box is provided with a removable cover 81 fitting in an opening 82 in the top and provided with fastening devices. (Not shown.)

Mounted in suitable bearings on the standard 47 and auxiliary standard 85 and also rising from the beam 5 is a shaft 86 provided with a face friction-pulley 87. In contact with the frictional face of this pulley 87 bears the periphery of a friction-disk 88 carried by a vertical stem 89 mounted in suitable bearings on the standard 47 and provided at its upper end with a pointer 90 traversing a graduated dial 91. The friction-disk 88 is in contact at its periphery with the surface of the conical friction-pulley 59 and deriving motion therefrom communicates it to the friction-pulley 87. Mounted upon a stub-shaft 92 on the casting 93, which is attached to the cross-beam 5, is a crank-disk 94 connected by means of a pitman 95 with the dropping-bar 64, and on the front side of said crank-disk 94 is fixed a bevel-gear 96, with which meshes a bevel-gear 97, also mounted upon a stub-shaft 98 projecting from the casting 93. The bevel-gear 97 carries a ratchet-wheel 98ª, and pivotally connected to the casting 93 in operative relation with this ratchet-wheel is an oscillatory arm 99, the free extremity of which is depressed in the path of a projection 100 on the disk 101, which is fixed to the shaft 86. As the shaft 86 rotates the projection 100 is brought at intervals in contact with the free end of the arm 99, thus swinging the latter forward at its free end and causing it to engage the teeth of the ratchet 98ª and advance the same. Said arm 99 is provided with a return-spring 102, whereby it returns to its normal position after each operation, and the disk 101 is provided with an auxiliary projection 103, which is normally arranged upon the opposite side of the disk from the projection 100, but which may be arranged upon the same side therewith when the machine is used for drilling. It is obvious that when the projection 103 is upon the opposite side of the disk from the projection 100 that it is out of the path of the lever 99, and hence cannot affect the operation thereof. The projections 100 and 103 are preferably provided with antifriction-rolls 104.

Fixed to the shaft 86 is a cam 105 having a mutilated flange 106, which is arranged in opposite relation with the free end of a rocking lever 107 pivoted to a bracket 108 secured to the rear side of the cross-beam 5. The opposite end of said rocking lever 107 is connected by means of a link 109 with the upper extremity of the stem 110 of a marker 111, which is slidably mounted in guides 112 and 113 on the bracket 108. Interposed between the guides 112 and 113 and bearing at its lower end against a collar 114 fixed to the stem of the marker is an actuating-spring 115. As the shaft 86 rotates the complete or unbroken portion of the flange 106 holds the marker in its elevated position against the tension of its actuating-spring 115, and when the broken or mutilated portion of said flange reaches a point opposite the free end of the lever 107 the marker is depressed and makes an impression in the soil to indicate the planting of a hill.

The operation of the above mechanism is as follows: The motion of the driving-wheel is communicated through the shaft 34 and the intermediate gearing to the spindle 53, which carries the double conical friction-roller 59. The surface of this double conical friction-roller is held permanently in contact with the periphery of the friction-disk 88 by means of the actuating-spring of the follower 50, and when the parts of the machine are in their normal positions the center or largest diameter of the friction-roller 59 is in contact with the friction-disk. When, however, by reason of irregularities in the surface of the soil the main frame is raised or lowered from its normal position, as hereinbefore described, the casting 41 is simultaneously moved and the friction-roller 59 is either raised or lowered to bring a different portion of its surface in contact with the friction-disk. Inasmuch as all diameters of the friction-roller 59 are smaller than the diameter which is normally in engagement with the friction-disk, it is obvious that any movement either upward or downward will result in a reduction of the speed of the friction-disk 88, and that the reduction of speed will be proportionate to the deflection of the main frame from its normal position. Hence as the ground-wheels pass over a rise or a depression in the surface the motion of the planting mechanism is diminished in speed, thus planting the hills at longer intervals measured on the surface or following the irregularities, but at uniform intervals, by actual measurement in a horizontal plane or a plane parallel with the general surface of the field.

The pointer 90 which traverses the dial 91 indicates the distances between the contiguous hills in a row, and in connection with other devices herein described provides for the adjustment of the planting mechanism to bring the first hill of a row opposite to the marker or at the beginning of the row. Said mechanism consists of a graduated bar 116 arranged longitudinally with relation to the direction of movement of the machine, and an aligning-rod 117 provided with an eye 118 fitted upon the bar 116 and adapted to be aligned with the marks indicating the initial points of a series of rows before starting the machine. After aligning this rod with the initial points or marks of the rows the graduations on the bar 116 will indicate the distance from the plane of the seed-chute to the said line of marks, and by turning the planting mechanism backward a distance corresponding with that indicated by the graduations on said bar 116 the planting mechanism may be caused to operate precisely at the proper time to plant the first hill on the line of marks.

It is obvious that a pin may be inserted in one of the openings 27 of the bracket 25 to hold the foot-lever 22 in a depressed position, but that under ordinary circumstances and during the operation of the machine the foot-lever is allowed to swing freely in the bracket, as this is necessary for the proper operation of the mechanism.

In order to provide for sowing in drills, the cam 105 is provided with a removable section 106ª forming a part of the flange 106, whereby when said section is removed the lever 107 receives two vibrations for each revolution of the cam.

It will be understood that in practice various changes in the form, proportion, and the minor details of construction may be resorted to without departing from the spirit of the invention or sacrificing any of the advantages thereof.

Having described our invention, what we claim is—

1. In a machine of the class described, the combination with a main frame, ground-wheels, a planter-frame loosely connected to the main frame, and planting mechanism carried by said planter-frame, of connections between a ground-wheel and the planting mechanism including a friction-disk, and a friction-pulley arranged in contact, said friction-pulley having a conical or tapered friction surface, and means for reciprocating the conical pulley to bring different portions of its surface in contact with the friction-disk as the relative positions of the main and planter frames vary, substantially as specified.

2. In machine of the class described, the combination with a main frame, ground-wheels, a planter-frame, and planting mechanism carried by the planter-frame, of a friction-disk, connections between said disk and the planting mechanism, a double conical friction-pulley having its surface in contact with the periphery of the friction-disk, connections between said friction-pulley and a ground-wheel, and means for connecting the main frame and said pulley, whereby a vertical movement of the former causes an axial movement of the latter to vary the point of contact of the friction-pulley with the friction-disk, substantially as specified.

3. The combination with a main frame, ground-wheels, a planter-frame, and planting mechanism carried by the planter-frame, of a friction-disk, connections between the friction-disk and the planting mechanism, a rock-shaft mounted in bearings carried by the planter-frame, a casting supported by arms of said rock-shaft, a conical friction-pulley having its spindle mounted at one end in said casting and arranged with its surface in contact with the edge of the friction-disk, connections between the friction-pulley and a ground-wheel, and a lever fixed to the rock-shaft and loosely connected to the main frame, substantially as specified.

4. The combination with a main frame, ground-wheels, a planter-frame, and planting mechanism carried by the planter-frame, of a friction-disk, operating connections between the friction-disk and the planting mechanism, a rock-shaft mounted in bearings carried by the planter-frame and provided with lateral arms, a casting pivotally connected to the arms of the rock-shaft, a conical friction-pulley having its spindle mounted at its lower end in a bearing in said casting and arranged with its surface in contact with the periphery of the friction-disk, an actuating-spring for maintaining a uniform pressure of the surface of the friction-pulley against the periphery of the friction-disk, operating connections between the friction-pulley and a ground-wheel, and connections between the main frame and said rock-shaft, whereby a vertical movement of the former causes a rocking movement of the latter, substantially as specified.

5. The combination with a main frame, ground-wheels, a planter-frame, and planting mechanism carried by the planter-frame, of a friction-disk, operating connections between said disk and the planting mechanism, a rock-shaft mounted in bearings carried by the planter-frame, a casting loosely connected to arms of said rock-shaft, a friction-pulley having its stem mounted at its lower end in a bearing in said casting, a guide or way, a follower-block mounted in said guide or way and having a bearing in which is loosely fitted the other end of the stem of the friction-pulley, an actuating-spring for holding the follower-block in position to maintain the surface of the friction-pulley in contact with the periphery of the friction-disk, operating connections between the friction-pulley and a ground-wheel, and connections between the main frame and the rock-shaft, substantially as specified.

6. The combination with a main frame, ground-wheels, a planter-frame, and planting mechanism carried by the planter-frame, of a friction-disk, operating connections between the friction-disk and the planting mechanism, a rock-shaft mounted in bearings carried by the planter-frame, a casting loosely connected to arms of the rock-shaft, connections between the rock-shaft and the main frame, whereby a vertical movement of the latter causes a rocking movement of the former, a conical friction-pulley having a stem to which it is slidably connected to said stem being mounted at one end in a bearing in said casting, a yoke having eyes slidably fitted upon the stem of the friction-pulley in contact with the extremities of the conical or slidable portion of said pulley, means for supporting said yoke to maintain the conical or slidable portion of the pulley in the desired position with relation to its stem, means for maintaining the stem of the friction-pulley in position to produce a uniform pressure of the surface of said pulley upon the periphery of the friction-disk, and operating connections between the friction-pulley and a ground-wheel, substantially as specified.

7. The combination with a main frame, ground-wheels, a planter-frame, and planting mechanism carried by the planter-frame, of a friction-disk, operating connections between the friction-disk and the planting mechanism, a vertically reciprocable casting, connections between said casting and the main frame, a conical friction-pulley having a stem upon which it is slidably fitted, said stem being mounted at one end in a bearing in said casting, a bar pivotally connected to the casting, a yoke slidably fitted upon the bar and having eyes embracing the stem of the friction-pulley in contact with the extremities of the slidable or conical portion of said pulley, means for securing the yoke in the desired position with relation to the bar upon which it is mounted, a follower-block mounted in a suitable guide and having openings through which extend said bar and stem, a spring for advancing the follower-block to hold the conical surface of the friction-pulley in contact with the periphery of the friction-disk, means for retracting the follower-block and locking the same in its retracted position to maintain the surface of the friction-pulley out of contact with the friction-disk, and operating connections between the friction-pulley and a ground-wheel, substantially as specified.

8. The combination with a main frame, ground-wheels, a planter-frame, and planting mechanism carried by the planter-frame, of a friction-disk, operating connections between the friction-disk and the planting mechanism, a pointer attached to the axis of the friction-disk and traversing a dial, a conical friction-pulley, means for maintaining the surface of the friction-pulley in contact with the periphery of the friction-disk, means for reciprocating the friction-pulley axially as the main frame rises and falls in consequence of irregularities in the surface of the soil traversed by the machine, and operating connections between the friction-pulley and a ground-wheel, substantially as specified.

9. The combination with a main frame, ground-wheels, a planter-frame, and planting mechanism carried by the planter-frame, of a shaft, operating connections between said shaft and the planting mechanism, a disk fixed to the shaft and having a mutilated flange, a spring-actuated marker, a lever connected to the stem of said marker and arranged at one end in operative relation with the mutilated flange of said disk, and means for communicating motion from a ground-wheel to the shaft, substantially as specified.

10. The combination with a main frame, ground-wheels, a planter-frame, and planting mechanism carried by the planter-frame, of a shaft, a ratchet-wheel, operating connections between the ratchet-wheel and the planting mechanism, a spring-actuated lever arranged in operative relation with the ratchet-wheel, a disk fixed to the said shaft and provided with a lateral stud or projection to engage the free end of said spring-actuated lever, and operating connections between said shaft and a ground-wheel, substantially as specified.

11. The combination with a main frame, ground-wheels, a planter-frame, and planting mechanism carried by the planter-frame, of a shaft mounted in bearings upon the planter-frame, operating connections between said shaft and the planting mechanism, a face friction-disk fixed to the said shaft, a peripheral friction-disk arranged with its axis perpendicular to that of the face friction-disk and having its periphery in contact with the face thereof, indicating devices connected to the stem of the peripheral friction-disk to indicate the intervals between the operations of the planting mechanism, a double conical friction-pulley arranged with its surface in contact with the periphery of the peripheral friction-disk, means for reciprocating the conical pulley axially as the elevation of the main frame varies in accordance with the irregularities in the surface of the soil, and connections between the friction-pulley and a ground-wheel, substantially as specified.

12. The combination with a main frame, ground-wheels, a planter-frame having furrow-opening shoes, a planting mechanism on the planter-frame, and operating connections between a ground-wheel and the planting mechanism, of flat floating shoes arranged above the furrow-opening shoes and adapted to bear upon the surface of the soil to limit the depression of the furrow-opening shoes, the floating shoes being arranged at their front ends in advance of the furrow-opening shoes and terminating at their rear ends in advance of the rear ends of the furrow-opening shoes, substantially as specified.

13. The combination with a main frame, ground-wheels, a planter-frame having furrow-opening shoes, a planting mechanism, and operating connections between the planting mechanism and a ground-wheel, of floating shoes arranged above the plane of the furrow-opening shoes and pivotally connected at their front ends to the planter-frame, and terminating at their rear ends in advance of the rear ends of the furrow-opening shoes, and means for adjusting the rear ends of said floating shoes to vary the depression of the furrow-opening shoes into the soil, said means including perforated ears 13 on the furrow-opening shoes, and pins or bolts to engage the rear ends of the floating shoes and one of the perforations in the ears, substantially as specified.

14. The combination with a framework, ground-wheels, planting mechanism, connections between the planting mechanism and the ground-wheels, and indicating devices operatively connected with the planting mechanism to indicate the intervals between the operations of the planting mechanism, of a horizontal gage-bar arranged parallel with the longitudinal beams of the framework and provided with graduations representing linear measurement corresponding with those of the indicating devices, and an upright aligning or sight bar slidably mounted upon said gage-bar and adapted to be aligned with the initial marks of a series of rows to show the distance necessary for the machine to move before it reaches a position to plant upon said line of initial marks, substantially as specified.

In testimony that we claim the foregoing as our own we have hereto affixed our signatures in the presence of two witnesses.

HENRY H. HOOBLER.
MELVIN P. HEADLEE.

Witnesses:
TOMMY OLINGER,
M. L. OLINGER.